J. A. PEASE.
Hand-Seeder.
No. 9,731.                                          Patented May 17, 1853.
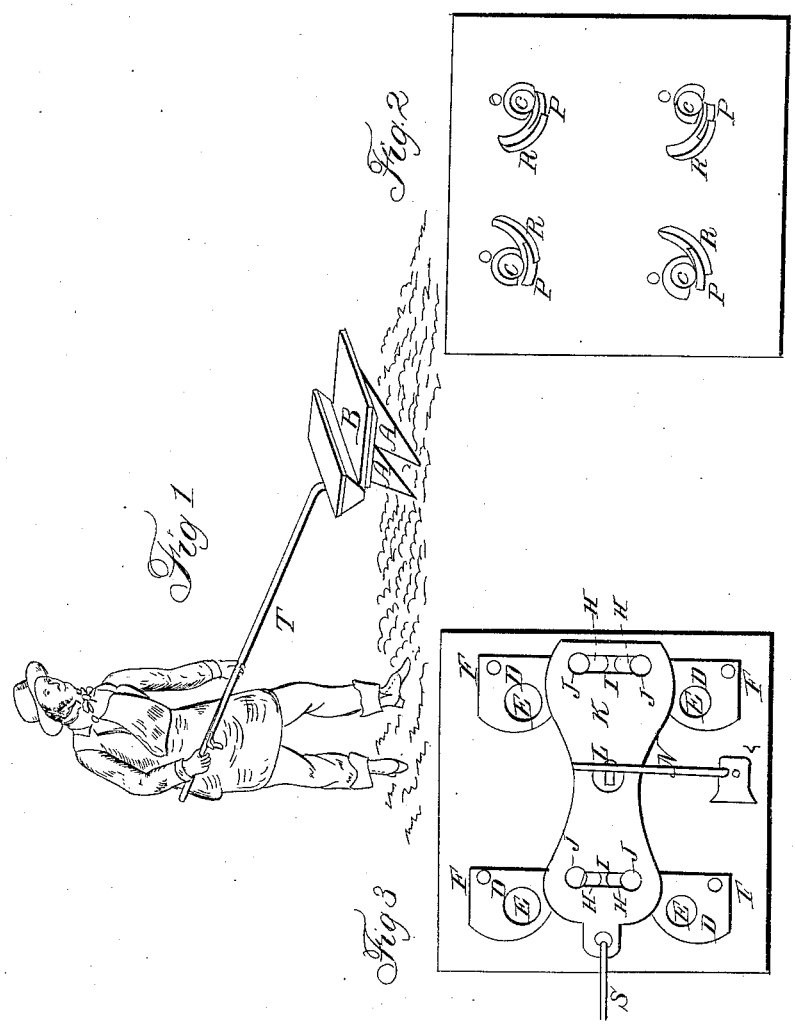

UNITED STATES PATENT OFFICE.

JULIUS A. PEASE, OF NEW YORK, N. Y.

IMPROVEMENT IN SEEDING-HOES.

Specification forming part of Letters Patent No. 9,731, dated May 17, 1853.

*To all whom it may concern:*

Be it known that I, JULIUS A. PEASE, of the city of New York, in the county and State of New York, have invented a new and Improved Seed-Planter; and I do hereby declare that the following is a full and exact description thereof, reference being had to the accompanying drawings, and to letters of reference marked thereon, in which—

Figure 1 is a perspective view, and Figs. 2 and 3 are sectional views.

The nature of my invention consists in the combination and arrangement of a double-bladed hoe with seed-box and drop, so constructed and arranged as to drop four kernels of corn at equal distances apart into the opening in the ground behind each blade, made by the stroke of the hoe, said seed to be covered by the back-stroke of said hoe as it is lifted from the ground.

To enable others skilled in the art to make and use my invention, I will proceed to describe its construction and operation.

I make my hoe with two blades, A A, Fig. 1, one behind the other about three inches, on the top of which I place my seed-box B. In the bottom of my box, Fig. 2, I have four holes, C, each sufficiently large to allow a kernel of corn to pass through. Two-thirds the way around each hole I have a guard, O, to prevent the seed from dropping through, except that within the guard when the holes are opened. I also have springs P, which play in front of the opening of the guards, which keeps the seed from entering within the guards when the holes are open. Said springs are attached to quarter-circle plates D, Fig. 3, which work on the under side of box B, said springs working through slots in bottom of the box and within guards R on the inside of said box, Fig. 2. My quarter-circle plates are fastened to bottom of said box by rivets F, on which they turn. There are projections on said quarter-circle plates H, Fig. 3, that are attached to movable plate K by means of rivets J, which work in slots I I, said movable plate K being attached to slide U, Fig. 1, near the end of the handle T, by means of a wire, S, Fig. 3. In my quarter-circle plates I have holes E, corresponding in size with those in bottom of box B. Near the center of movable plate K is a pin, L, against which bears a spring, N, which keeps the holes shut in bottom of box B. Said spring N is fastened at one end, v, to the bottom of said box.

In operating the planter it is used as the ordinary hoe. When the blades are struck into the ground, they leave behind them an opening, into which the corn is dropped by pulling the slide near the end of the handle with the forefinger of the right hand, which brings the holes in the quarter-circle plates under the holes in bottom of the box, allowing the kernels within the guards to pass through, and at the same time shutting off the grain from entering within said guards. The seed is covered by the back-stroke of the hoe as it is raised from the ground.

I have two blades to my hoe, to obviate the necessity of drawing the earth forward to drop the corn, as is the case with the ordinary hoe, the stroke of the two blades leaving sufficient opening behind each for the purpose.

What I claim as new and of my invention, and desire to secure by Letters Patent, is—

The combination and arrangement of a double-bladed hoe with seed-box and drop, as before described, for the purpose of planting separate kernels of corn at equal distances apart.

JULIUS A. PEASE.

Witnesses:
THOMAS HALL,
C. W. REN.